United States Patent

Wolf et al.

[11] Patent Number: 5,531,413
[45] Date of Patent: Jul. 2, 1996

[54] ADJUSTABLE-LENGTH COLUMN FOR CHAIRS, TABLES OR THE LIKE

[75] Inventors: Herbert Wolf, Nürnberg; Harald Harrer, Neumarkt, both of Germany

[73] Assignee: Suspa Compart Aktiengesellschaft, Altdorf, Germany

[21] Appl. No.: 226,304

[22] Filed: Apr. 12, 1994

[30] Foreign Application Priority Data

Apr. 27, 1993 [DE] Germany ............. 43 13 766.0

[51] Int. Cl.$^6$ ................................... F16M 11/24
[52] U.S. Cl. .............. 248/188.2; 248/631; 248/622; 248/404
[58] Field of Search ............... 248/188.2, 404, 248/622, 631; 297/344.19; 267/64.12; 188/322.18

[56] References Cited

U.S. PATENT DOCUMENTS

| | | | |
|---|---|---|---|
| 4,941,799 | 7/1990 | Gordon et al. | 414/678 |
| 5,106,157 | 4/1992 | Nagelkirk | 297/304 |
| 5,188,345 | 2/1993 | Siegner et al. | 267/131 |

FOREIGN PATENT DOCUMENTS

| | | |
|---|---|---|
| 2164943 | 7/1973 | Germany. |
| 77169836 | 5/1977 | Germany. |
| 3202669 | 8/1983 | Germany. |
| 3817767 | 12/1989 | Germany. |

*Primary Examiner*—Leslie A. Braun
*Assistant Examiner*—Gwendolyn A. Wrenn
*Attorney, Agent, or Firm*—Browdy and Neimark

[57] ABSTRACT

An adjustable-length column for chairs or the like has an upright tube and a pneumatic or hydropneumatic length-adjusting element arranged in the latter, the housing of the element being radially supported in the upright tube and displaceably guided in the direction of a common axis. A profile guarding against twisting is tightly arranged on the housing in particular by shrinking and has at least one radially projecting web which extends parallel to the axis and engages with a groove-like recess of a guide which is non-rotatably connected with the upright tube.

13 Claims, 1 Drawing Sheet

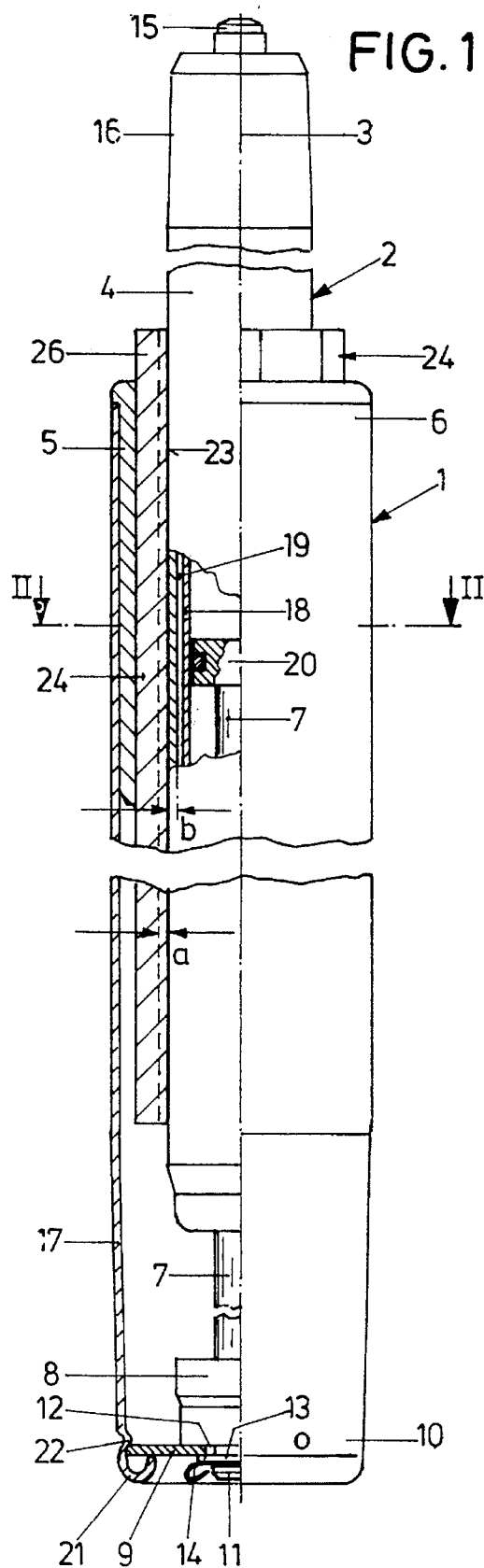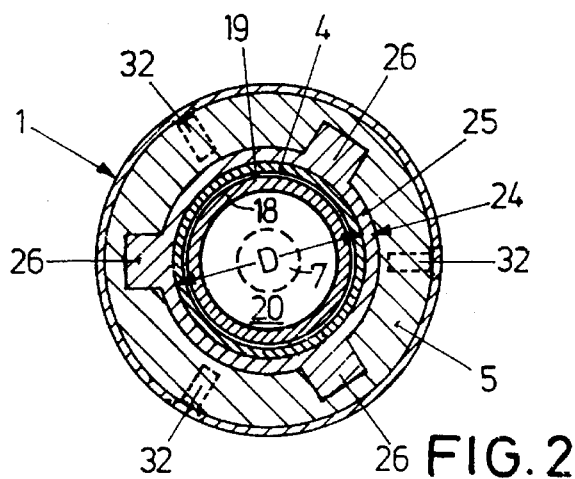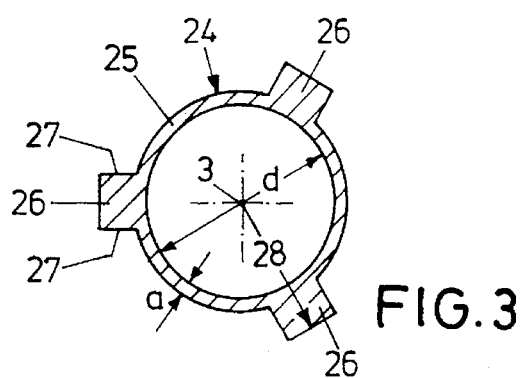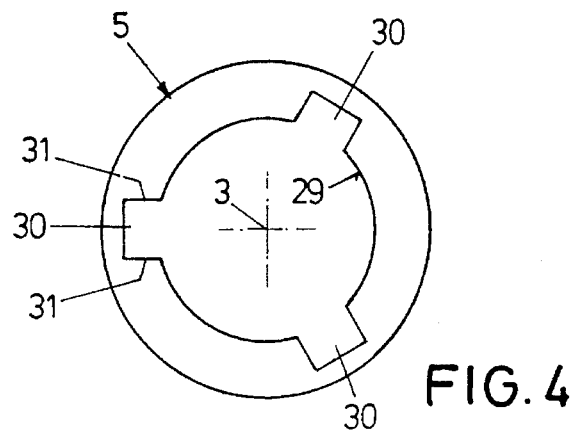

ADJUSTABLE-LENGTH COLUMN FOR CHAIRS, TABLES OR THE LIKE

BACKGROUND OF THE INVENTION

1. Field of the Invention

The invention relates to an adjustable-length column for chairs, tables or the like comprising an upright tube and a pneumatic or hydropneumatic length-adjusting element arranged therein concentrically of a common central longitudinal axis, the housing of which element is radially supported in a guide of the upright tube and displaceably guided in the direction of the axis, and the piston rod of which element is arrested, in the vicinity of its free end, on a bottom plate of the upright tube in the direction of the axis, the housing being guided, by means of a non circular-cylindrical and non-circular cross-section, displaceably in the direction of the axis in a recess suited in cross-section.

2. Background Art

An adjustable-length column of the generic type is known in which the housing of the gas spring serving as a length adjusting element has a non-circular, as a rule hexagon cross-section. The recess, serving for guiding, of the guide bushing has a corresponding cross-section. This configuration is extraordinarily difficult to produce and, moreover, has the disadvantage of the housing tilting in the guide bushing for comparatively strong twisting strain so that impeccable axial displacement is no longer possible.

SUMMARY OF THE INVENTION

It is an object of the invention to embody an adjustable-length column of the generic kind such that a reliably and impeccably working safeguard against twisting is attained.

According to the invention this object is solved by the features wherein a profile guarding against twisting and separate from the housing is fastened on the housing, which profile has at least one web extending in parallel to the axis, and wherein the web is guided in a groove-like recess of the guide, which recess is adapted in cross-section to the web, and which guide is non-rotatable in relation to the upright tube. The measures according to the invention ensure that a conventional adjust- able-length column can be used of which the length adjusting element has a circular cylindrical housing. The additional profile guarding against twisting is arranged on this housing. The guide bushing must be adapted correspondingly. Any further parts do not need adaptation. By reason of the configuration comprising the web it is ensured that there is no jamming or wedging even with comparatively strong twisting strain between the housing on the one hand and the upright tube on the other hand. With one of its flanks the web bears against a corresponding contact surface of the groove-like recess.

Further features, details and advantages of the invention result from the ensuing description of an example of embodiment taken in conjunction with the drawing.

BRIEF DESCRIPTION OF THE DRAWING

FIG. 1 is a longitudinal view of an adjustable-length column in an illustration partially broken open, FIG. 2 is a cross-section through the column along the section line II-II of FIG. 1, FIG. 3 is a cross-section through a profile guarding against twisting, and FIG. 4 is a plan view of a guide bushing.

DESCRIPTION OF THE PREFERRED EMBODIMENT

The chair column shown in the drawing has an upright tube 1, in which an adjustable-length gas spring in the form of a pneumatic or hydro-pneumatic piston-cylinder adjusting element is disposed. The upright tube 1 and the gas spring 2 have a common central longitudinal axis 3.

An external annular cylindrical housing 4 of the gas spring 2 is displaceably supported in the direction of the axis 3 in a guide bushing 5, which is disposed on one end 6 — in the drawing the upper end — of the upright tube 1.

Protruding from the housing 4 of the gas spring is a piston rod 7, which is supported in the direction of the axis 3 via an axial roller bearing 8 relative to a bottom plate 9 of the upright tube 1. The bottom plate 9 is located on the end 10 of the upright tube 1 opposite the first end 6; in the drawing, the end 10 is shown at the bottom. A protrusion 11 of the piston rod 7 that penetrates the axial roller bearing 8 extends through an opening 12, embodied concentrically with the axis 3, of the bottom plate 9. A shim 13 and a spring securing ring 14 secure the protrusion 11 against being pulled out toward the underside of the bottom plate 9. Since, with its piston rod 7, the gas spring 2 is fixed relative to the upright tube 1 in the direction of the axis 3, upon longitudinal adjustment of the gas spring 2 by actuation of an actuating pin 15, the housing 4 of the gas spring 2 is extended out of the upright tube 1 or retracted into it. The actuating pin 15 is located on the end of the housing 4 of the gas spring 2 opposite the piston rod 7. A chair seat or table top is also secured there on a possibly conical securing section 16 of the housing 4.

Adjacent to the end 10, the upright tube 1 has a cone section 17 tapering slightly conically toward it, by means of which it is possible to fasten the upright tube 1 in a corresponding conical bushing of a multi-legged chair base or the like.

A cylindrical inner tube 18 having an annular passage way 19 formed between itself and the housing 4 is arranged—likewise coaxially to the axis 3—in the housing 4 of the gas spring 2. A piston 20 is arranged on the end, located inside the housing 4, of the piston rod 7 and rests in a sealed manner on the internal wall of the inner tube 18.

The bottom plate 9 in the form of an annular disk is supported on a rim 21, which is rolled inward in a cup-like fashion, of the upright tube 1 in the vicinity of its end 10. This inwardly rolled rim 21 has an approximately semicircular shape in cross-section; in other words, it has approximately the cross-section of half of a circular ring.

To prevent the bottom plate 9 from being pulled upward out of the upright tube 1, protrusions 22 are embodied directly above the bottom plate 9 in the upright tube 1, protruding from its inner wall 20; they may be produced by indenting the tube from the outside. For example, six such protrusions 22 can be provided, distributed uniformly over the circumference. This provision prevents the removal upward of the gas spring 2 and bottom plate 9 from the upright tube 1, for instance if the chair is being raised by its seat portion. These protrusions 22 accordingly need not absorb major forces, but only the weight of the upright tube 1 with a multi-legged pedestal attached to it.

As far as described herein the gas spring 2 is generally known, commercially available and illustrated and described for instance in U.S. Pat. No. 3,711,054. As far as described herein the column serving primarily as a chair column but also as a column for tables or the like is also generally known and illustrated and described for instance in U.S. Pat. No. 4,969,619.

A profile 24 guarding against twisting is fastened on the circular cylindrical external wall 23 of the housing 4 of the gas spring 2. This profile 24 guarding against twisting has an annular cylindrical, i.e. tubular, section 25, from the circumference of which several webs 26—preferably three in the present case—project and extend in parallel to the axis 3.

The tubular section 25 has a thickness a that corresponds about to the thickness b of the housing 4. The webs 26 have flanks 27 extending in parallel to a radius 28 which extends from the axis 3 through the middle of a web 26.

The profile 24 guarding against twisting consists of aluminum or an aluminum alloy, respectively, and is produced by extrusion. When in a condition not applied to the housing 4, it has an inside diameter d which is a bit smaller than the outside diameter D of the housing 4, ambient temperature being taken as a basis in each case. By heating the profile 24 for instance to 180° C., its inside diameter d is enlarged to slightly more than D so that the profile 24 can be slipped on to the housing 4 of ambient temperature. After cooling, the profile 24 sits tightly and non-rotatably on the housing 4. Since the material of the profile 24 is distinctly softer than the steel of which the housing 4 is made and than the layer of hard chromium conventionally applied to its outer surface, the aluminium of the profile 24 penetrates into minute furrows in the outer surface of the housing 4, thereby improving the anchoring between the profile 24 and the housing 4. The seals located in the gas spring 2 are not damaged by the exposure to temperature, because, due to the profile 24 being shrunk on the housing 4, only temperatures of distinctly less than 100° C. occur in the internal chamber of the gas spring 2. Since the thicknesses a and b are about the same, the heat storing capacity of the profile 24 does not exceed that of the gas spring 2, but rather it is smaller, which results in only comparatively little heating of the gas spring. By reason of the fact that the profile 24 consists of aluminum or of an aluminum alloy and that the housing 4 of the gas spring 2 consists of steel, there is no risk of the housing 4 being deformed when the profile 24 is shrunk on the latter.

As seen in FIG. 1, the profile 24 guarding against twisting extends over the major part of the length of the housing 4 with the exception of the end portions, one of which being the securing section 16 of the gas spring 2.

As seen in FIGS. 2 and 4, the guide bushing 5 has an inside cross-section suited to the cross-section of the profile 24 guarding against twisting. Consequently, it has a circular cylindrical inner recess 29 corresponding to the outside diameter of the section 25 so that the latter is guided substantially without clearance in the recess 29. The recess 29 is additionally provided with three groove-like recesses 30 distributed at equal angular distances over its circumference and corresponding in cross-section to the cross-section of the webs 26. In particular, these groove-like recesses 30 have contact surfaces 31, against which the flanks 27 of the profile 24 guarding against twisting bear substantially without clearance. As a result the profile 24 guarding against twisting and together with it the housing 4 of the gas spring 2 are guided displaceably in the direction of the axis 3 in the guide bushing 5 in a manner safe from twisting, i.e. non-rotatably about the axis 3. A chair seat or the like fastened on the securing section 16 of the gas spring 2 cannot be rotated in relation to the guide bushing 5. So as to have this non-rotatability also vis-à-vis to the upright tube 1, the guide bushing 5 is connected with the upright tube 1 by means of several securing screws 32 extending radially to the axis 3. As shown in the drawing, the guide bushing 5 can be solid.

The upright tube 1 and the guide bushing 5 may also be integrally formed for instance from plastic material. Upright tubes integrally made of plastic material which have no separate guide bushing, but in which the guide surfaces are formed directly in the upright tube, are known for instance from U.S. Ser. No. 08/004 244.

What is claimed is:

1. An adjustable-length column for chairs, tables or the like, comprising:

an upright tube (1);

a pneumatic or hydropneumatic length-adjusting element disposed in the tube (1) concentrically with a common central longitudinal axis (3), the length-adjusting element having a piston rod (7) and a housing (4) radically supported in a guide of the upright tube (1) and guided displaceably in the direction of the axis (3);

a bottom plate (9) of said upright tube (1) to which the piston rod (7) of the element is secured in the vicinity of a free end thereof;

wherein a profile (24) guarding against twisting and separate from the housing (4) is fastened on the housing (4), which profile (24) has at least one web (26) extending in parallel to the axis (3), and wherein the web (26) is guided in a groove-like recess (30) of the guide (5), which recess (30) is adapted in cross-section to the web (26), and which guide (5) is non-rotatable in relation to the upright tube (1);

wherein the profile (24) guarding against twisting has an annular cylindrical section (25) with which the at least one web (26) is formed in one piece;

wherein the profile (24) guarding against twisting consists of one of aluminium and an aluminium alloy;

wherein the profile (24) guarding against twisting is connected with the housing (4) of the length-adjusting element by shrunk-on-press fit, and wherein the housing (4) of the length-adjusting element is made of steel.

2. A column according to claim 1, wherein the profile (24) guarding against twisting consists of one of aluminum and an aluminum alloy.

3. A column according to claim 1, wherein the profile (24) guarding against twisting is an extrusion-molded part.

4. A column according to claim 1, wherein the profile (24) guarding against twisting is connected with the housing (4) of the length-adjusting element by shrunk-on press fit.

5. An adjustable-length column for chairs, tables or the like, comprising:

an upright tube (1):

a pneumatic or hydropneumatic length-adjusting element disposed in the tube (1) concentrically with a common central longitudinal axis (3), the length-adjusting element having a piston rod (7) and a housing (4) radially supported in a guide of the upright tube (1) and guided displaceably in the direction of the axis (3) ;

a bottom plate (9) of said upright tube (1) to which the piston rod (7) of the element is secured in the vicinity of a free end thereof;

wherein a profile (24) guarding against twisting and separated from the housing (4) is fastened on the housing (4), which profile (24) has at least one web (26) extending in parallel to the axis (3), and wherein the web (26) is guided in a groove-like recess (30) of the guide (5), which the groove like recess (30) is adapted in cross-section to the web (26), and which guide (5) is non-rotatable in relation to the upright tube (1);

wherein the at least one web (26) has flanks (27) which are about parallel to a radius (28) extending from the axis (3) through the web (26) and which bear against suited contact surfaces (31) of the groove-like recess (30).

6. A column according to claim 1, wherein the guide is formed by a guide bushing (5) separate from the upright tube (1), which guide bushing (5) is non-rotatably connected with the upright tube (1).

7. A column according to claim 1, wherein the profile (24) guarding against twisting consists of one of aluminum or and an aluminum alloy.

8. A column according to claime 7, wherein the profile (24) guarding against twisting is an extrusion-molded part.

9. A column according to claim 8, wherein the profile (24) guarding against twisting is connected with the housing (4) of the length adjusting element by shrunk-on press fit.

10. A column according to claim 1, wherein the profile (24) guarding against twisting is an extrusion-molded part.

11. A column according to claim 1, wherein the profile (24) guarding against twisting is connected with the housing (4) of the length adjusting element by shrunk-on press fit.

12. A column according to claim 1, wherein the guide is formed by a guide bushing (5) separate from the upright tube (1), which guide bushing (5) is non-rotatably connected with the upright tube (1).

13. A column according to claim 5, wherein the guide is formed by a guide bushing (5) separate from the upright tube (1), which guide bushing (5) is non-rotatably connected with the upright tube (1).

* * * * *